US010995245B2

(12) United States Patent
Ota et al.

(10) Patent No.: US 10,995,245 B2
(45) Date of Patent: May 4, 2021

(54) EPOXY RESIN COMPOSITION AND ELECTRO-CONDUCTIVE ADHESIVE CONTAINING THE SAME

(71) Applicant: THREEBOND CO., LTD., Tokyo (JP)

(72) Inventors: Soichi Ota, Tokyo (JP); Takashi Suzuki, Tokyo (JP); Makoto Kato, Tokyo (JP); Hitoshi Mafune, Tokyo (JP); Masayuki Osada, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 2 days.

(21) Appl. No.: 16/321,555

(22) PCT Filed: Jul. 28, 2017

(86) PCT No.: PCT/JP2017/027496
§ 371 (c)(1),
(2) Date: Jan. 29, 2019

(87) PCT Pub. No.: WO2018/030184
PCT Pub. Date: Feb. 15, 2018

(65) Prior Publication Data
US 2019/0177582 A1 Jun. 13, 2019

(30) Foreign Application Priority Data
Aug. 10, 2016 (JP) .............................. JP2016-157127

(51) Int. Cl.
*C09J 163/00* (2006.01)
*C09J 9/02* (2006.01)
*C08G 59/40* (2006.01)
*C08L 63/00* (2006.01)

(52) U.S. Cl.
CPC ............ *C09J 163/00* (2013.01); *C08G 59/40* (2013.01); *C08L 63/00* (2013.01); *C09J 9/02* (2013.01)

(58) Field of Classification Search
None
See application file for complete search history.

(56) References Cited

U.S. PATENT DOCUMENTS

| | | | | |
|---|---|---|---|---|
| 5,721,323 A | * | 2/1998 | Schultz | C08G 59/18 525/504 |
| 5,925,624 A | * | 7/1999 | Gregson | A61P 37/06 514/46 |
| 2002/0010287 A1 | * | 1/2002 | Ohashi | C08G 59/184 525/486 |
| 2004/0014842 A1 | | 1/2004 | Takeda et al. | |
| 2010/0221545 A1 | * | 9/2010 | Abe | C09J 163/00 428/406 |
| 2014/0178671 A1 | | 6/2014 | Dreezen et al. | |
| 2014/0326929 A1 | * | 11/2014 | Hsueh | H01B 1/22 252/519.21 |
| 2015/0322309 A1 | * | 11/2015 | Hu | H01L 23/293 427/553 |

FOREIGN PATENT DOCUMENTS

| | | | |
|---|---|---|---|
| CN | 103814098 A | | 5/2014 |
| CN | 103820065 A | | 5/2014 |
| JP | S62-145601 A | | 6/1987 |
| JP | 2002-187938 A | | 7/2002 |
| JP | 2005-132854 A | | 5/2005 |
| JP | 2005132854 A | * | 5/2005 |
| JP | 2007106852 A | | 4/2007 |
| JP | 2008001867 A | | 1/2008 |
| JP | 2011-114037 A | | 6/2011 |
| JP | 2014531495 A | | 11/2014 |

OTHER PUBLICATIONS

English text machine translation of Ono et al. (JP 2005-132854 A), retrieved online from Espacenet, as a PDF pp. 1-9. (Year: 2005).*
International Search Report with an English translation and Written Opinion dated Oct. 31, 2017 in corresponding International Application No. PCT/JP2017/027496; 13 pages.
Chinese Office Action dated Dec. 14, 2020, in connection with corresponding CN Application No. 201780047946.5 (10 pp., including machine-generated English translation).

* cited by examiner

*Primary Examiner* — Katie L. Hammer
(74) *Attorney, Agent, or Firm* — Maier & Maier, PLLC

(57) ABSTRACT

An epoxy resin composition which exhibits excellent storage stability while having a low initial viscosity and favorable low temperature curability and an electro-conductive adhesive containing the same. An epoxy resin composition includes components (A) to (C): component (A): an epoxy resin (excluding the following component (B)); component (B): an epoxy resin having one epoxy group in a molecule and a surface tension of from 28.5 to 35.0 mN/m; and component (C): a latent curing agent.

7 Claims, No Drawings

US 10,995,245 B2

EPOXY RESIN COMPOSITION AND ELECTRO-CONDUCTIVE ADHESIVE CONTAINING THE SAME

FIELD

The present invention relates to an epoxy resin composition and an electro-conductive adhesive containing the same.

BACKGROUND

In JP S62-145601 A, an electro-conductive resin composition containing an epoxy resin is described. The composition exhibits excellent in low temperature curability but has a problem of exhibiting low storage stability.

Meanwhile, in JP 2005-132854 A, an electro-conductive adhesive in which a low molecular weight epoxy resin is used as a reactive diluent is described and it is described that the composition can exhibit both low temperature curability and storage stability.

SUMMARY

However, the composition described in JP 2005-132854 A cures at a high temperature (150° C.) and the low temperature curability thereof is insufficient. In addition, the composition described in the literature has a problem of having a high initial viscosity (higher than 50 Pa·s) and thus exhibiting poor workability.

As described above, it has been hitherto difficult to realize a low temperature curable epoxy resin composition having a low initial viscosity and favorable storage stability and an electro-conductive adhesive using this epoxy resin composition. Particularly in the case of an electro-conductive adhesive, a large amount of electro-conductive filler is added thereto, there is thus a problem that gelation thereof is likely to proceed, and the storage stability thereof is required to be improved.

Accordingly, it is an object of the present invention to provide an epoxy resin composition which exhibits excellent storage stability while having a low initial viscosity and favorable low temperature curability and an electro-conductive adhesive containing the same.

As a result of intensive investigations to achieve the above object, the inventors of the present invention have found out that the above-mentioned problems can be solved by the following configuration, and thus completed the present invention.

A first embodiment of the present invention is an epoxy resin composition including components (A) to (C):

component (A): an epoxy resin (excluding the following component (B));

component (B): an epoxy resin having one epoxy group in a molecule and a surface tension of from 28.5 to 35.0 mN/m; and component (C): a latent curing agent.

A second embodiment of the present invention is the epoxy resin composition according to the first embodiment, wherein the component (C) is an epoxy adduct type latent curing agent.

A third embodiment of the present invention is the epoxy resin composition according to the first or second embodiment, wherein the component (A) has two or more epoxy groups in a molecule.

A fourth embodiment of the present invention is the epoxy resin composition according to any one of the first to third embodiments, wherein the component (B) is contained at from 100 to 200 parts by mass with respect to 100 parts by mass of the component (A).

A fifth embodiment of the present invention is the epoxy resin composition according to any one of the first to fourth embodiments, further containing a reaction inhibitor as a component (D).

A sixth embodiment of the present invention is the epoxy resin composition according to the fifth embodiment, wherein the component (D) is contained at from 0.1 to 10 parts by mass with respect to 100 parts by mass of the component (A).

A seventh embodiment of the present invention is the epoxy resin composition according to any one of the first to sixth embodiments, wherein the component (B) includes at least one kind selected from the group consisting of neodecanoic acid 2-oxiranylmethyl ester, a mixture of C11 to C15 alcohol glycidyl ethers, p-tert-butylphenyl glycidyl ether, and p-sec-butylphenyl glycidyl ether.

An eighth embodiment of the present invention is the epoxy resin composition according to any one of the first to seventh embodiments, further containing an electro-conductive filler as a component (E), in which the component (E) is contained at from 400 to 2000 parts by mass with respect to 100 parts by mass of the component (A).

A ninth embodiment of the present invention is an electro-conductive adhesive containing the epoxy resin composition set forth in the eighth embodiment.

DETAILED DESCRIPTION

The epoxy resin composition (hereinafter also simply referred to as the composition) according to an embodiment of the present invention contains a component (A): an epoxy resin (excluding the following component (B)), a component (B): an epoxy resin having one epoxy group in the molecule and a surface tension of from 28.5 to 35.0 mN/m, and a component (C): a latent curing agent. By having this configuration, an epoxy resin composition which exhibits excellent storage stability while having a low initial viscosity and favorable low temperature curability and an electro-conductive adhesive containing this epoxy resin composition are provided.

Incidentally, in the present specification, "X to Y" is used in the sense of including the numerical values (X and Y) described before and after "to" as the lower limit value and the upper limit value, respectively. In addition, the operation and measurement of physical properties and the like are conducted under the conditions of room temperature (20° C. to 25° C.)/relative humidity of 40% to 50% RH unless otherwise stated.

The details of the present invention will now be described.

<Component (A)>

The epoxy resin composition according to the present invention contains an epoxy resin excluding the following component (B) as a component (A). From the viewpoint of forming a network by curing and enhancing curability, it is preferable that the component (A) has two or more epoxy groups in the molecule. Among these, it is more preferable that the component (A) has from 2 to 3 epoxy groups in the molecule, and it is particularly preferable that the component (A) has two epoxy groups in the molecule. The component (A) may be used singly or two or more kinds thereof may be used concurrently.

The weight of the component (A) per epoxy equivalent is preferably from 50 to 500 g/eq and more preferably from 100 to 300 g/eq. The effect of the present invention is further improved when the weight per epoxy equivalent is in the above range.

Specific examples of the component (A) may include those to be obtained by condensation of epichlorohydrin with polyhydric phenols such as bisphenols or polyhydric alcohols, for example, a glycidyl ether type epoxy resin such as a bisphenol A type, a brominated bisphenol A type, a hydrogenated bisphenol A type, a bisphenol F type, a bisphenol S type, a bisphenol AF type, a biphenyl type, a naphthalene type, a fluorene type, a novolac type, a phenol novolac type, a ortho-cresol novolac type, a tris(hydroxyphenyl)methane type, or a tetraphenylolethane type. In addition to these, examples thereof may include a glycidyl ester type epoxy resin to be obtained by condensation of epichlorohydrin with a carboxylic acid such as a phthalic acid derivative or a fatty acid, a glycidyl amine type epoxy resin to be obtained by reaction of epichlorohydrin with amines, cyanuric acids, or hydantoins, and epoxy resins modified by various methods, but the examples are not limited thereto. Among these, it is preferable that the component (A) has at least either of a bisphenol A skeleton or a bisphenol F skeleton and it is more preferable that the component (A) has both a bisphenol A skeleton and a bisphenol F skeleton when the physical properties of the cured product are taken into consideration.

As the component (A), a commercially available product may be used, examples thereof may include 827, 828EL, YL983U, and the like as jER (registered trademark) series manufactured by Mitsubishi Chemical Corporation, and 830, EXA-835 LV, and the like as EPICLON (registered trademark) series manufactured by DIC Corporation. Examples thereof may include YD-128, YDF-170, and the like as Epotoho (registered trademark) series manufactured by NIPPON STEEL & SUMITOMO METAL CORPORATION, but the examples are not limited thereto.

<Component (B)>

The epoxy resin composition according to the present invention contains an epoxy resin having one epoxy group in the molecule and a surface tension of from 28.5 to 35.0 mN/m as a component (B). The storage stability as an epoxy resin composition decreases (see Comparative Examples 1 to 16 of the present application) in a case in which the surface tension of the component (B) is less than 28.5 mN/m or more than 35.0 mN/m. Although the reason for this is not clear, a possibility is conceivable that the following component (C) dissolves in the composition and the curing reaction thus proceeds in a case in which the surface tension of the component (B) is less than 28.5 mN/m or more than 35.0 mN/m.

Specific examples of the component (B) may include neodecanoic acid 2-oxiranylmethyl ester, a mixture of C11 to C15 alcohol glycidyl ethers, p-tert-butylphenyl glycidyl ether, p-sec-butylphenyl glycidyl ether, and the like, but the examples are not limited thereto. Among these, neodecanoic acid 2-oxiranylmethyl ester or p-tert-butylphenyl glycidyl ether is preferable from the viewpoint of further improvement in storage stability. Here, the "mixture of C11 to C15 alcohol glycidyl ethers" refers to a mixture containing at least two kinds selected from the group consisting of monodecyl glycidyl ether, dodecyl glycidyl ether, tridecyl glycidyl ether, tetradecyl glycidyl ether, and pentadecyl glycidyl ether. The composition ratio of the respective components in the mixture is not particularly limited as long as the surface tension of the mixture satisfies the range of from 28.5 to 35.0 mN/m.

As the component (B), a commercially available product may be used, and there are Cardura (registered trademark) E-10P manufactured by Momentive Performance Materials Inc., DENACOL (registered trademark) EX-192 manufactured by Nagase ChemteX Corporation, TB and SB as EPIOL (registered trademark) series manufactured by NOF CORPORATION, and the like, but the commercially available product is not limited thereto.

The component (B) may be used singly or two or more kinds thereof may be used concurrently.

In the composition of the present invention, the amount of the component (B) added is preferably from 50 to 250 parts by mass, more preferably from 100 to 200 parts by mass, and still more preferably from 150 to 200 parts by mass with respect to 100 parts by mass of the component (A). It is possible to further lower the viscosity in a case in which the component (B) is added at 50 parts by mass or more (preferably 100 parts by mass or more), and it is possible to maintain the storage stability in a case in which the component (B) is added at 250 parts by mass or less (preferably 200 parts by mass or less).

<Component (C)>

The epoxy resin composition according to the present invention contains a latent curing agent as a component (C). Here, a latent curing agent refers to a curing agent capable of securing storage stability so that a time dependent change in the viscosity and a time dependent change in the physical properties are minor in a one-package epoxy resin in which the curing agent which is solid at 25° C. is dispersed in an epoxy resin which is liquid at 25° C., for example.

As the component (C), any latent curing agent capable of curing the component (A) and the component (B) can be used, and examples thereof may include a compound pulverized into a powder form. Specific examples thereof may include a imidazole derivative which is powdery at room temperature and an epoxy adduct type latent curing agent which is a powder obtained by pulverizing an epoxy adduct compound in which a tertiary amine is added to an epoxy resin and the reaction thereof is stopped in the middle, but the examples are not limited thereto. It is particularly preferable that the component (C) is the epoxy adduct type latent curing agent from the viewpoint of achieving both storage stability and low temperature curability. It is preferable that the component (C) is curable at 100° C. or less and it is more preferable that the component (C) is curable at 90° C. or less.

As the component (C), a commercially available product may be used, and examples thereof may include AMICURE (registered trademark) series manufactured by Ajinomoto Fine-Techno Co., Inc., FXR-1020, FXR-1081, and the like of FUJICURE (registered trademark) series manufactured by T & K TOKA CO., LTD., Novacure (registered trademark) series manufactured by Asahi Kasei Chemicals Corp, and the like.

The component (C) may be used singly or two or more kinds thereof may be used concurrently.

In the composition of the present invention, the amount of the component (C) added is preferably from 10 to 100 parts by mass, more preferably from 40 to 90 parts by mass, and still more preferably from 60 to 80 parts by mass with respect to 100 parts by mass of the component (A). The curability does not diminish in a case in which the component (C) is added at 10 parts by mass or more, and the storage stability can be maintained in a case in which the component (C) is added at 100 parts by mass or less.

<Component (D)>

It is preferable that the epoxy resin composition of the present invention further contains a reaction inhibitor as a component (D) in addition to the components (A) to (C) described above. The reaction inhibitor is a compound which inhibits the reaction of the epoxy resins of the component (A) and component (B) with the component (C). In the present invention, the influence of the component (B) greatly affects the storage stability, but the reaction can be further inhibited by using the component (D). Particularly in the case of using a mixture of C11 to C15 alcohol glycidyl ethers or p-sec-butylphenyl glycidyl ether as the component (B), it is preferable to further contain the component (D) since the storage stability is remarkably improved.

As the component (D), phosphoric acid, a borate ester, an alkylphosphate, p-toluenesulfonic acid or an ester thereof, and the like can be used.

Examples of the borate ester may include tributyl borate, trimethoxyboroxin, triethyl borate, tri-n-propyl borate, triisopropyl borate, tri-n-butyl borate, tripentyl borate, triallyl borate, trihexyl borate, tricyclohexyl borate, trioctylborate, trinonylborate, tridecylborate, tridodecyl borate, trihexadecyl borate, trioctadecyl borate, tris(2-ethylhexyloxy)borane, bis(1,4,7,10-tetraoxaundecyl) (1,4,7,10,13-pentaoxatetradecyl) (1,4,7-trioxaundecyl) borane, tribenzyl borate, triphenyl borate, tri-o-tolyl borate, tri-m-tolyl borate, triethanolamine borate, and the like, but the examples are not limited thereto. As the borate ester, one mixed with an epoxy resin and/or a phenol resin in advance may be used, and L-01B and L-07N (blend of epoxy-phenol-borate ester) of CUREDUCT (registered trademark) series manufactured by SHIKOKU CHEMICALS CORPORATION and the like can be used as such a commercially available product.

As the alkyl phosphate, trimethyl phosphate, tributyl phosphate and the like can be used, but the alkyl ester of phosphoric acid is not limited thereto.

Examples of the ester of p-toluenesulfonic acid may include methyl p-toluenesulfonate, ethyl p-toluenesulfonate, and the like, but the examples are not limited thereto.

The component (D) may be used singly or two or more kinds thereof may be used in mixture. It is preferable that the component (D) is phosphoric acid, tributyl borate, trimethoxyboroxin, methyl p-toluenesulfonate when the storage stability is taken into consideration.

In the composition of the present invention, the amount of the component (D) added is preferably from 0.1 to 10 parts by mass, more preferably from 0.5 to 4 parts by mass, and still more preferably from 2 to 4 parts by mass with respect to 100 parts by mass of the component (A). It is possible to more favorably maintain the storage stability in a case in which the component (D) is added at 0.1 parts by mass or more, and it is possible to exert higher low temperature curability in a case in which the component (D) is added at 10 parts by mass or less.

<Component (E)>

It is preferable that the epoxy resin composition according to the present invention further contains an electro-conductive filler as a component (E) in addition to the components (A) to (C) described above. With regard to the electro-conductive filler, the material for the particles and the shape of the particles are not limited as long as the particles exert conductivity. Examples of the material for the electro-conductive particles may include a silver powder, a nickel powder, a palladium powder, a carbon powder, a tungsten powder, a plated powder, and the like, and a silver powder is particularly preferable. In addition, examples of the shape of the electro-conductive particles may include a spherical shape, an amorphous shape, a flaky (scaly) shape, a filamentous shape (needle shape), a dendritic shape, and the like. Plural kinds of electro-conductive particles may be used in mixture. In particular, electro-conductive particles (silver plated powder) obtained by subjecting an insulating metal oxide, a nickel powder, or a powder of an insulator to a silver plating treatment are preferable since the raw material cost is low. Specific examples of the insulating metal oxide may include a copper powder, an aluminum powder, an iron powder, and the like, and the insulating metal oxide is a metal of which the surface is passivated and which does not thus exert conductivity.

As the component (E), it is preferable to use at least either of a silver powder or a silver plated powder and it is more preferable to use both a silver powder and a silver plated powder when the cost and conductivity are taken into consideration.

In order to knead the resin components, the 50% average particle diameter of the component (E) is preferably 100 μm or less, more preferably 20 μm or less, still more preferably 10 μm or less, and particularly preferably 6 μm or less. The lower limit value of the 50% average particle diameter of the component (E) is not particularly limited, but it is preferably 1 μm or more and more preferably 2 μm or more.

As the component (E), from the viewpoint of achieving both the fluidity of the adhesive and the electrical properties of the cured product, it is preferable to concurrently use electro-conductive fillers having different 50% average particle diameters and it is more preferable to concurrently use an electro-conductive filler having a 50% average particle diameter of 1 μm or more and less than 5 μm (hereinafter also referred to as the "component (E-1)") and an electro-conductive filler having a 50% average particle diameter of 5 μm or more and less than 10 μm (hereinafter also referred to as the component (E-2)). Incidentally, in the present specification, a value measured by using a laser granulometer is adopted as the 50% average particle diameter of the component (E).

The specific surface area of the component (E) is preferably from 0.1 to 5 $m^2/g$ and more preferably from 0.3 to 3 $m^2/g$. In addition, for the same reason as above, it is preferable to concurrently use electro-conductive fillers having different specific surface areas and it is more preferable to concurrently use an electro-conductive filler having a specific surface area of 0.1 $m^2/g$ or more and less than 1 $m^2/g$ (component (E'-1)) and an electro-conductive filler having a specific surface area of 1 $m^2/g$ or more and less than 3 $m^2/g$ (component (E'-2)) as the component (E). Incidentally, in the present specification, a value calculated by the BET method is adopted as the specific surface area.

The tap density of the component (E) is preferably from 0.2 to 10 $g/cm^3$ and more preferably from 0.5 to 6 $g/cm^3$.

The component (E) is contained in the composition at preferably from 400 to 2000 parts by mass, more preferably from 400 to 1000 parts by mass, and still more preferably from 400 to 700 parts by mass with respect to 100 parts by mass of the component (A). The conductivity is favorable in a case in which the component (E) is contained at 400 parts by mass or more, and cobwebbing and the like are less likely to occur and the workability is further improved in a case in which the component (E) is contained at 2000 parts by mass or less.

In other words, the epoxy resin composition according to a preferred embodiment of the present invention further contains an electro-conductive filler as the component (E), and the component (E) is contained in the composition at from 400 to 2000 parts by mass with respect to 100 parts by mass of the component (A).

In a case in which the component (E-1) and the component (E-2) are concurrently used as the component (E), the mass ratio (component (E-1):component (E-2)) of the component (E-1) to the component (E-2) is preferably from 40:60 to 90:10, more preferably from 50:50 to 80:20, and still more preferably from 60:40 to 70:30. It is possible to achieve both the fluidity of the adhesive and the electrical properties of the cured product to a higher extent when the mass ratio is in the above range. In addition, for the same reason, the mass ratio (component (E'-1):component (E'-2)) of the component (E'-1) to the component (E'-2) is from 40:60 to 90:10, more preferably from 50:50 to 80:20, and still more preferably from 60:40 to 70:30.

<Other Components>

[Curing Agent]

As a curing agent other than the component (C), a curing agent, which is liquid at 25° C., such as an acid anhydride, a phenol compound, or a thiol compound may be contained in a range in which the properties of the present invention are not impaired. Usually, curing slowly proceeds even when a liquid curing agent is used singly, but the component (C) can act as a curing accelerator of the liquid curing agent as the liquid curing agent is concurrently used with the component (C).

[Filler]

Furthermore, a filler (excluding those corresponding to the component (E)) can be added in a range in which the properties of the present invention are not impaired. Fillers are classified as an inorganic filler and an organic filler. Examples of the inorganic filler may include a metal powder which does not exert conductivity (metal powder of which the surface is passivated by oxidation), an alumina powder, a calcium carbonate powder, a talc powder, a silica powder, a fumed silica powder, and the like, and examples of the organic filler may include acrylic particles, rubber particles, styrene particles, and the like, but the examples are not limited thereto. By adding a filler, it is possible to improve the strength as well as to control the viscosity and thixotropy. The powder properties such as the average particle diameter and shape are not particularly limited, but the average particle diameter is preferably from 0.001 to 50 μm when ease of dispersion in the composition and nozzle clogging are taken into consideration. In particular, thixotropy is imparted and the storage stability is maintained as a fumed silica powder is added. Specific examples of the fumed silica powder may include AEROSIL R805, R972, and the like manufactured by NIPPON AEROSIL CO., LTD., but the examples are not limited thereto.

It is preferable that the filler is added to the composition at from 0.1 to 10 parts by mass with respect to 100 parts by mass of the component (A). It is possible to improve the workability as well as to stabilize the fluidity in a case in which the filler is added at 0.1 parts by mass or more, and it is possible to maintain the storage stability in a case in which the filler is added at 10 parts by mass or less.

In the present invention, additives such as coloring agents such as a pigment and a dye, a flame retardant, an antioxidant, a defoaming agent, a coupling agent, and a leveling agent may be blended in appropriate amounts in a range in which the properties of the present invention are not impaired. By addition of these, it is possible to obtain an adhesive or a cured product thereof, which exhibits excellent conductivity, resin strength, adhesive strength, workability, storage stability, and the like.

EXAMPLES

Next, the present invention will be described in more detail with reference to Examples, but the present invention is not limited to only these Examples.

Examples 1 to 20 and Comparative Examples 1 to 20

In order to prepare an epoxy resin and an electro-conductive adhesive, the following components were prepared.

Component (A): An Epoxy Resin (Excluding the Component (B))
  Mixture of bisphenol A type epoxy resin/bisphenol F type epoxy resin (weight ratio 50/50) (EPICLON (registered trademark) EXA-835LV manufactured by DIC Corporation, having two epoxy groups in the molecule, weight per epoxy equivalent: 165 g/eq)

Component (B): An Epoxy Resin Having One Epoxy Group in the Molecule and a Surface Tension of from 28.5 to 35.0 mN/m
  Neodecanoic acid 2-oxiranylmethyl ester (Cardura (registered trademark) E-10P manufactured by Momentive Performance Materials Inc.)
  Mixture of C11 to C15 alcohol glycidyl ethers (DENACOL (registered trademark, the same applies hereinafter) EX-192 manufactured by Nagase ChemteX Corporation)
  p-tert-butylphenyl glycidyl ether (EPIOL (registered trademark, the same applies hereinafter) TB manufactured by NOF CORPORATION)
  p-sec-butylphenyl glycidyl ether (EPIOL SB manufactured by NOF CORPORATION)

Component (B'): An Epoxy Resin Having an Epoxy Group in the Molecule Other than the Component (B)
  2-Ethylenehexa glycidyl ether (DENACOL EX-121 manufactured by Nagase ChemteX Corporation)
  Neopentyl glycol diglycidyl ether (ED-523T manufactured by ADEKA Corporation)
  Phenyl glycidyl ether (DENACOL EX-141 manufactured by Nagase ChemteX Corporation)
  Multifunctional glycidyl amine type epoxy resin (EP-3950S manufactured by ADEKA Corporation)

Component (C): A Latent Curing Agent
  Epoxy adduct type latent curing agent (FUJICURE (registered trademark) FXR-1081 manufactured by T & K TOKA CO., LTD.)

Component (D): A Reaction Inhibitor
  Blend of epoxy-phenol-borate ester (CUREDUCT (registered trademark) L-07N manufactured by SHIKOKU CHEMICALS CORPORATION)

Component (E): An Electro-Conductive Filler
  Electro-conductive Filler 1: a silver powder having the following powder properties
    Tap density: 5.9 g/cm$^3$
    50% average particle diameter: 2.5 μm
    BET specific surface area: 0.3 m$^2$/g
  Electro-conductive Filler 2: a silver plated copper powder having the following powder properties
    Tap density: 0.7 g/cm$^3$
    50% average particle diameter: 6.0 μm
    BET specific surface area: 1.9 m$^2$/g

[Measurement of Surface Tension]

The surface tension of the components (B) and (B') was measured. Specifically, the surface tension was measured by using an automatic surface tensiometer YD-200 manufactured by Kyowa Interface Science Co., Ltd. in an environment of 25° C. When the probe touches the surface of the liquid, the probe is wet with the liquid and the probe is going to be pulled into the liquid since the surface tension acts along the periphery of the probe at this time. This pulling force is read and taken as the "surface tension (mN/m)". A platinum plate was used as the probe. The results are summarized in Table 1.

The component (B) or (B') corresponds to a reactive diluent, and the surface tension thereof differs depending on the structure and the like. Although the clear reason is not known, there is a possibility that the surface tension affects the solubility of the component (C) in the composition).

Preparation of Examples 1 to 16 and Comparative Examples 1 to 16

In order to prepare an epoxy resin composition, the component (A), the component (B) (or component (B')), and the component (D) are weighed and charged into a stirring pot for a stirrer. The components are stirred for 30 minutes in order to be uniformly mixed. Thereafter, the component (C) is weighed and charged into the same stirring pot and the mixture is stirred for further 30 minutes. The detailed amounts prepared are as presented in Tables 2-1 to 2-4, and all the numerical values are expressed in parts by mass.

TABLE 1

| Name of raw material | Surface tension (mN/m) |
|---|---|
| EX-121 | 28.1 |
| E-10P | 29.0 |
| EX-192 | 30.0 |
| TB | 32.2 |
| SB | 33.2 |
| ED-523T | 35.4 |
| EX-141 | 41.6 |
| EP-3950S | 50.5 |

TABLE 2-1

| Components | Raw materials | Example 1 | Example 2 | Example 3 | Example 4 | Example 5 | Example 6 | Example 7 | Example 8 |
|---|---|---|---|---|---|---|---|---|---|
| Component (A) | EXA-835LV | 100 | 100 | 100 | 100 | 100 | 100 | 100 | 100 |
| Component (B) | E-10P | 150 | | | | 150 | | | |
| | EX-192 | | 150 | | | | 150 | | |
| | TB | | | 150 | | | | 150 | |
| | SB | | | | 150 | | | | 150 |
| Component (B') | EX-121 | | | | | | | | |
| | ED-523T | | | | | | | | |
| | EX-141 | | | | | | | | |
| | EP-3950S | | | | | | | | |
| Component (C) | FXR-1081 | 75 | 75 | 75 | 75 | 75 | 75 | 75 | 75 |
| Component (D) | L-07N | 4 | 4 | 4 | 4 | 2 | 2 | 2 | 2 |
| Sum | | 329 | 329 | 329 | 329 | 327 | 327 | 327 | 327 |

TABLE 2-2

| Components | Raw materials | Example 9 | Example 10 | Example 11 | Example 12 | Example 13 | Example 14 | Example 15 | Example 16 |
|---|---|---|---|---|---|---|---|---|---|
| Component (A) | EXA-835LV | 100 | 100 | 100 | 100 | 100 | 100 | 100 | 100 |
| Component (B) | E-10P | 150 | | | | 150 | | | |
| | EX-192 | | 150 | | | | 150 | | |
| | TB | | | 150 | | | | 150 | |
| | SB | | | | 150 | | | | 150 |
| Component (B') | EX-121 | | | | | | | | |
| | ED-523T | | | | | | | | |
| | EX-141 | | | | | | | | |
| | EP-3950S | | | | | | | | |
| Component (C) | FXR-1081 | 75 | 75 | 75 | 75 | 75 | 75 | 75 | 75 |
| Component (D) | L-07N | 0.5 | 0.5 | 0.5 | 0.5 | | | | |
| Sum | | 326 | 326 | 326 | 326 | 325 | 325 | 325 | 325 |

TABLE 2-3

| Components | Raw materials | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Component (A) | EXA-835LV | 100 | 100 | 100 | 100 | 100 | 100 | 100 | 100 |
| Component (B) | E-10P | | | | | | | | |
| | EX-192 | | | | | | | | |
| | TB | | | | | | | | |
| | SB | | | | | | | | |
| Component (B') | EX-121 | 150 | | | | 150 | | | |
| | ED-523T | | 150 | | | | 150 | | |
| | EX-141 | | | 150 | | | | 150 | |
| | EP-3950S | | | | 150 | | | | 150 |

TABLE 2-3-continued

| Components | Raw materials | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Component (C) | FXR-1081 | 75 | 75 | 75 | 75 | 75 | 75 | 75 | 75 |
| Component (D) | L-07N | 4 | 4 | 4 | 4 | 2 | 2 | 2 | 2 |
| Sum | | 329 | 329 | 329 | 329 | 327 | 327 | 327 | 327 |

TABLE 2-4

| Components | Raw materials | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|
| Component (A) | EXA-835LV | 100 | 100 | 100 | 100 | 100 | 100 | 100 | 100 |
| Component (B) | E-10P | | | | | | | | |
| | EX-192 | | | | | | | | |
| | TB | | | | | | | | |
| | SB | | | | | | | | |
| Component (B') | EX-121 | 150 | | | | 150 | | | |
| | ED-523T | | 150 | | | | 150 | | |
| | EX-141 | | | 150 | | | | 150 | |
| | EP-3950S | | | | 150 | | | | 150 |
| Component (C) | FXR-1081 | 75 | 75 | 75 | 75 | 75 | 75 | 75 | 75 |
| Component (D) | L-07N | 0.5 | 0.5 | 0.5 | 0.5 | | | | |
| Sum | | 326 | 326 | 326 | 326 | 325 | 325 | 325 | 325 |

Examples 1 to 16 and Comparative Examples 1 to 16 were subjected to the measurement of initial viscosity, examination of storage stability, and examination of curability. The results are summarized in Table 3.

[Measurement of Initial Viscosity]

The composition is weighed by 2.0 mL after being stirred with a polytetrafluoroethylene rod, and the viscosity thereof is measured by using BROOKFIELD (model number: DV-2+Pro) in a state in which the temperature of the composition is set at 25° C. by using a temperature controlling apparatus. As the measurement conditions, CPE-41 (3°×R2.4) is used as the cone rotor and the rotational speed is 10 rpm. The viscosity after 3 minutes is taken as the "initial viscosity (Pa·s)". It is preferable that the initial viscosity 1 Pas or less when the handling property in a case in which an electro-conductive filler is further added to the composition is taken into consideration.

[Examination of Storage Stability]

The initial viscosity (Pa·s) is determined by the measurement of initial viscosity described above. Thereafter, the vessel containing the composition is stored in an atmosphere at 25° C. After 1, 2, 4, 6, 8, 24, 36, 48, and 72 hours from the start of storage, the viscosity is measured by the same method as that in the measurement of initial viscosity. It is judged that the stability is impaired at a time point at which the viscosity is two times or more the initial viscosity, and the measurement time point which is previous by one measurement time point than this time point is taken as the "storage stability (hours)". In other words, the storage stability is 24 hours in a case in which the viscosity is two times or more the initial viscosity after 36 hours. In addition, it is written as "72 or more" in a case in which the viscosity is not two times or more the initial viscosity at the time point after 72 hours. It is preferable to maintain the storage stability for longer than 24 hours and it is more preferable to maintain the storage stability for 36 hours or longer when a change in the viscosity at the time of operation is taken into consideration.

[Examination of Curability]

A masking tape having a thickness of 50 μm is pasted on a glass plate having a length of 100 mm×a width of 50 mm×a thickness of 2.0 mm so as to have a length of 100 mm×a width of 10 mm, and a uniform coating film of the composition is formed thereon by using a squeegee, thereby fabricating a test piece (n=2 per one condition). The test pieces are charged into a hot air drying oven in an atmosphere of 80° C., respectively, and left to stand for 10, 20, 30, and 40 minutes, respectively, and then the test pieces are taken out from the hot air drying oven. After the temperature of the test piece has decreased to 25° C., the surface of the cured product is touched with a polytetrafluoroethylene rod, and the time at which the trace does not remain on the cured product any more is evaluated as the "curability". In order to maintain low temperature curability, it is preferable that the coating film is cured in less than 40 minutes and it is more preferable that the coating film is cured in 30 minutes or less.

TABLE 3

| Test items | Example 1 | Example 2 | Example 3 | Example 4 | Example 5 | Example 6 | Example 7 | Example 8 |
|---|---|---|---|---|---|---|---|---|
| Initial viscosity | 0.1 | 0.1 | 0.2 | 0.1 | 0.1 | 0.2 | 0.1 | 0.2 |
| Storage stability | 72 or more | 72 | 72 or more | 72 | 72 or more | 48 | 72 or more | 36 |
| Curability | 30 | 30 | 30 | 30 | 30 | 30 | 30 | 30 |

TABLE 3-continued

| Test items | Example 9 | Example 10 | Example 11 | Example 12 | Example 13 | Example 14 | Example 15 | Example 16 |
|---|---|---|---|---|---|---|---|---|
| Initial viscosity | 0.2 | 0.2 | 0.2 | 0.2 | 0.2 | 0.2 | 0.2 | 0.2 |
| Storage stability | 72 or more | 36 | 72 or more | 36 | 72 or more | 36 | 72 or more | 36 |
| Curability | 20 | 20 | 20 | 20 | 20 | 20 | 20 | 20 |

| Test items | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Initial viscosity | 0.1 | 0.2 | 0.1 | 3.1 | 0.1 | 0.2 | 0.2 | 3.5 |
| Storage stability | 2 | 8 | 8 | 8 | 2 | 8 | 6 | 6 |
| Curability | 30 | 40 | 30 | 20 | 30 | 40 | 30 | 20 |

| Test items | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Initial viscosity | 0.2 | 0.2 | 0.2 | 3.2 | 0.2 | 0.2 | 0.2 | 3.4 |
| Storage stability | 1 | 6 | 4 | 4 | 1 | 6 | 4 | 4 |
| Curability | 20 | 30 | 20 | 20 | 20 | 30 | 20 | 20 |

The initial viscosities of Comparative Examples except for Comparative Examples 4, 8, 12, and 16 and Examples 1 to 16 are 1 Pa·s or less. However, the storage stability of Examples and Comparative Examples are greatly different from each other, and the storage stability of Examples is longer than 24 hours and the storage stability of Comparative Examples is less than 24 hours when 24 hours is taken as the boundary line. For example, from Examples 1, 5, 9, and 13, it can be seen that the storage stability varies depending on the kind of the component (B) or the component (B') since the storage stability is not affected by the amount of the reaction inhibitor added although there is a difference in the amount of the reaction inhibitor added. The same also applies to Examples 3, 7, 11, and 15.

Preparation of Examples 17 to 20 and Comparative Examples 17 to 20

The component (A), the component (B) (or component (B')), and the component (D) are weighed and charged into a stirring pot for a stirrer. The components are stirred for 30 minutes in order to be uniformly mixed. Thereafter, the component (C) is weighed and charged into the same stirring pot and the mixture is stirred for further 30 minutes. Furthermore, the component (E) is weighed and charged into the same stirring pot and the mixture is stirred for 30 minutes while conducting vacuum defoaming. The detailed amounts prepared are as presented in Table 4, and all the numerical values are expressed in parts by mass.

TABLE 4

| Components | Raw materials | Example 17 | Example 18 | Example 19 | Example 20 | Comparative Example 17 | Comparative Example 18 | Comparative Example 19 | Comparative Example 20 |
|---|---|---|---|---|---|---|---|---|---|
| Component (A) | EXA-835LV | 100 | 100 | 100 | 100 | 100 | 100 | 100 | 100 |
| Component (B) | E-10P | 150 | 150 | 150 | 150 | | | | |
| | EX-192 | | | | | | | | |
| | TB | | | | | | | | |
| | SB | | | | | | | | |
| Component (B') | EX-121 | | | | | 150 | 150 | 150 | 150 |
| | ED-523T | | | | | | | | |
| | EX-141 | | | | | | | | |
| | EP-3950S | | | | | | | | |
| Component (C) | FXR-1081 | 75 | 75 | 75 | 75 | 75 | 75 | 75 | 75 |
| Component (D) | L-07N | 4 | 2 | 0.5 | | 4 | 2 | 0.5 | |
| Component (E) | Electro-conductive filler 1 | 330 | 330 | 330 | 330 | 330 | 330 | 330 | 330 |
| | Electro-conductive filler 2 | 165 | 165 | 165 | 165 | 165 | 165 | 165 | 165 |
| Sum | | 824 | 822 | 821 | 820 | 824 | 822 | 821 | 820 |

Examples 17 to 20 and Comparative Examples 17 to 20 were subjected to the measurement of initial viscosity, examination of storage stability, examination of curability (the same method as that described above), and measurement of volume resistivity. The results are summarized in Table 5. Hereinafter, the epoxy resin composition is also simply referred to as the composition.

[Measurement of Initial Viscosity]

The composition is weighed by 0.5 cc after being stirred with a polytetrafluoroethylene rod, and the viscosity thereof is measured by using BROOKFIELD (model number: DV-2+Pro) in a state in which the temperature of the composition is set at 25° C. by using a temperature controlling apparatus. As the measurement conditions, CPE-52 (3°×R1.2) is used as the cone rotor and the rotational speed is 5 rpm. The viscosity after 3 minutes is taken as the "initial viscosity (Pa·s)". It is preferable that the initial viscosity 50 Pas or less when the handling property is taken into consideration.

[Examination of Storage Stability]

The initial viscosity (Pa·s) is determined by the measurement of initial viscosity described above. Thereafter, the vessel containing the composition is stored in an atmosphere at 25° C. After 1, 2, 4, 6, 8, 24, 36, and 48 hours from the start of storage, the viscosity is measured by the same method as that in the measurement of initial viscosity. It is judged that the stability is impaired at a time point at which the viscosity is two times or more the initial viscosity, and the measurement time point which is previous by one measurement time point than this time point is taken as the "storage stability (hours)". It is written as "48 or more" in a case in which the viscosity is not two times or more the initial viscosity at the time point after 48 hours. It is preferable to maintain the storage stability for longer than 24 hours when a change in the viscosity at the time of operation is taken into consideration.

[Measurement of Volume Resistivity]

A masking tape (50 µm thick) is pasted on a glass plate having a thickness of 2.0 mm×a width of 50 mm×a length of 100 mm so as to have a length of 100 mm×a width of 10 mm, and a uniform coating film of the composition is formed thereon by using a squeegee, thereby fabricating a test piece (n=2). The test pieces are charged into a hot air drying oven in an atmosphere of 80° C., respectively, and left to stand for 60 minutes, and then the test pieces are taken out from the hot air drying oven. After the temperature of the test piece has decreased to 25° C., the "resistance value (Q)" is measured by using a dual display multimeter equipped with a plate-like electrode in a state in which the distance between the electrodes is 50 mm. The volume resistivity is calculated by (resistance value)×(width of cured product× thickness (cross-sectional area) of cured product)/(distance between electrodes) and taken as the "conductivity ($\times 10^{-4}$ $\Omega \cdot m$)". It is preferable that the conductivity is $10.0 \times 10^{-4}$ $\Omega \cdot m$ or less from the viewpoint of securing conductivity.

Examples 17 to 20 are compared with Comparative Examples 17 to 20 in the same manner as in the comparative investigation of the results in Table 3, and it can be seen that the storage stability of Examples 17 to 20 is more favorable than that of Comparative Examples 17 to 20. There is a risk that the component (C) is likely to be scraped and to gel when the electro-conductive filler of the component (E) and the component (C) are stirred together, but the properties other than the storage stability are not different from those of Comparative Examples as well as the storage stability is maintained in Examples 17 to 20.

INDUSTRIAL APPLICABILITY

In order to meet the demand for weight saving and cost reduction of electric and electronic equipment such as home appliances, opportunities to use materials exhibiting low heat resistance have increased. For this reason, the heat curing step of the epoxy resin composition and the electro-conductive adhesive is desired to be conducted at a lower temperature, but on the other hand, the materials are also desired to exhibit storage stability at the same time, and a technique for improving storage stability without impairing the curability of the composition is thus desired. The present invention is a useful technique for improving storage stability in an atmosphere at 25° C. without diminishing curability by selecting a reactive diluent, and the composition of the present invention can be used in various applications.

The invention claimed is:

1. An epoxy resin composition comprising:
    component (A): an epoxy resin having two or more epoxy groups in a molecule;
    component (B): an epoxy resin having one epoxy group in a molecule and a surface tension of from 28.5 to 35.0 mN/m, wherein component (B) is contained at from 100 to 200 parts by mass with respect to 10 parts by mass of component (A);
    component (C): a latent curing agent, wherein component (C) is contained at from 10 to 100 parts by mass with respect to 100 parts by mass of the component (A);
    component (D): a reaction inhibitor; and
    component (E): one or more electro-conductive fillers, wherein component (E) is contained at from 400 to 200 parts by mass with respect to 100 parts by mass of component (A),
    wherein the latent curing agent is a mixture of epoxy compound-modified amines and urea-modified amines.

2. The epoxy resin composition according to claim 1, wherein component (D) is contained at from 0.1 to 10 parts by mass with respect to 100 parts by mass of component (A).

3. The epoxy resin composition according to claim 1, wherein component (B) includes at least one selected from the group consisting of neodecanoic acid 2-oxiranylmethyl

TABLE 5

| Test items | Example 17 | Example 18 | Example 19 | Example 20 | Comparative Example 17 | Comparative Example 18 | Comparative Example 19 | Comparative Example 20 |
|---|---|---|---|---|---|---|---|---|
| Initial viscosity | 15.2 | 15.5 | 16.1 | 15.8 | 15.4 | 14.9 | 15.3 | 15.7 |
| Storage stability | 48 or more | 48 or more | 48 or more | 48 or more | 2 | 2 | 1 | 1 |
| Curability | 30 | 30 | 20 | 20 | 30 | 30 | 20 | 20 |
| Conductivity | 0.5 | 0.4 | 0.4 | 0.3 | 0.5 | 0.4 | 0.5 | 0.3 | ester, a mixture of C11 to C15 alcohol glycidyl ethers, p-tert-butylphenyl glycidyl ether, and p-sec-butylphenyl glycidyl ether.

4. An electro-conductive adhesive comprising the epoxy resin composition set forth in claim 1.

5. The epoxy resin composition according to claim 1, wherein the component (E) is a mixture of electro-conductive fillers: an electro-conductive filler having a 50% average particle diameter of 1 n or more and less than 5 μm and an electro-conductive filler having a 50% average particle diameter of 5 μm or more and less than 10 μm.

6. The epoxy resin composition according to claim 1, wherein the composition consisting of components (A), (B), (C), (D) and (E) has an initial viscosity that is not higher than 50 Pa·s.

7. The epoxy resin composition according to claim 1, wherein the component (E) comprises at least a silver powder.

* * * * *

UNITED STATES PATENT AND TRADEMARK OFFICE
CERTIFICATE OF CORRECTION

PATENT NO. : 10,995,245 B2
APPLICATION NO. : 16/321555
DATED : May 4, 2021
INVENTOR(S) : Soichi Ota et al.

It is certified that error appears in the above-identified patent and that said Letters Patent is hereby corrected as shown below:

In the Claims

In Columns 16 and 17, Claims 1 and 5, respectively, should be changed from "1. An epoxy resin composition comprising: component (A): an epoxy resin having two or more epoxy groups in a molecule; component (B): an epoxy resin having one epoxy group in a molecule and a surface tension of from 28.5 to 35.0 mN/m, wherein component (B) is contained at from 100 to 200 parts by mass with respect to 10 parts by mass of component (A); component (C): a latent curing agent, wherein component (C) is contained at from 10 to 100 parts by mass with respect to 100 parts by mass of the component (A); component (D): a reaction inhibitor; and component (E): one or more electro-conductive fillers, wherein component (E) is contained at from 400 to 200 parts by mass with respect to 100 parts by mass of component (A), wherein the latent curing agent is a mixture of epoxy compound-modified amines and urea-modified amines." to --1. An epoxy resin composition comprising: component (A): an epoxy resin having two or more epoxy groups in a molecule; component (B): an epoxy resin having one epoxy group in a molecule and a surface tension of from 28.5 to 35.0 mN/m, wherein component (B) is contained at from 100 to 200 parts by mass with respect to 100 parts by mass of component (A); component (C): a latent curing agent, wherein component (C) is contained at from 10 to 100 parts by mass with respect to 100 parts by mass of the component (A); component (D): a reaction inhibitor; and component (E): one or more electro-conductive fillers, wherein component (E) is contained at from 400 to 2000 parts by mass with respect to 100 parts by mass of component (A), wherein the latent curing agent is a mixture of epoxy compound-modified amines and urea-modified amines.--;

"5. The epoxy resin composition according to claim 1, wherein the component (E) is a mixture of electro-conductive fillers: an electro-conductive filler having a 50% average particle diameter of 1n or more and less than 5 μm and an electro-conductive filler having a 50% average particle diameter of 5 μm or more and less than 10 μm." to --5. The epoxy resin composition according to claim 1, wherein the component (E) is a mixture of electro-conductive fillers: an electro-conductive filler having a 50% average particle diameter of 1 μm or more and less than 5 μm and an electro-conductive filler having a 50% average particle diameter of 5 μm or more and less than 10 μm.--.

Signed and Sealed this
Tenth Day of May, 2022

Katherine Kelly Vidal
*Director of the United States Patent and Trademark Office*